(12) United States Patent
Kramer et al.

(10) Patent No.: US 10,156,016 B2
(45) Date of Patent: *Dec. 18, 2018

(54) TRIVALENT CHROMIUM-CONTAINING COMPOSITION FOR ALUMINUM AND ALUMINUM ALLOYS

(71) Applicant: HENKEL AG & CO. KGAA, Duesseldorf (DE)

(72) Inventors: Kirk Kramer, West Bloomfield, MI (US); Lisa Salet, Sterling Heights, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 913 days.

This patent is subject to a terminal disclaimer.

(21) Appl. No.: 13/834,047

(22) Filed: Mar. 15, 2013

(65) Prior Publication Data

US 2014/0272441 A1 Sep. 18, 2014

(51) Int. Cl.
*C23C 22/34* (2006.01)

(52) U.S. Cl.
CPC .......... *C23C 22/34* (2013.01); *C23C 2222/10* (2013.01)

(58) Field of Classification Search
CPC ..................................................... C23C 22/34
USPC ....................................................... 428/666
See application file for complete search history.

(56) References Cited

U.S. PATENT DOCUMENTS

| | | |
|---|---|---|
| 3,932,198 A | 1/1976 | Schneider |
| 4,084,014 A | 4/1978 | Fabregas |
| 4,169,741 A | 10/1979 | Lampatzer et al. |
| 4,171,231 A | 10/1979 | Bishop et al. |
| 4,183,772 A | 1/1980 | Davis |
| 4,266,988 A | 5/1981 | Krippes |
| 4,540,733 A | 9/1985 | Ito et al. |
| 4,644,029 A | 2/1987 | Cable et al. |
| 4,647,316 A | 3/1987 | Prescott |
| 4,705,821 A | 11/1987 | Ito et al. |
| 4,761,189 A | 8/1988 | Mady et al. |
| 4,801,337 A | 1/1989 | Higgins |
| 4,956,027 A | 9/1990 | Saeki et al. |
| 4,963,198 A | 10/1990 | Higgins |
| 4,966,634 A | 10/1990 | Saeki et al. |
| 4,992,116 A | 2/1991 | Hallman |
| 5,000,799 A | 3/1991 | Miyawaki |
| 5,039,360 A | 8/1991 | Brugarolas et al. |
| 5,045,130 A | 9/1991 | Gosset et al. |
| 5,073,196 A | 12/1991 | Fotinos et al. |
| 5,082,511 A | 1/1992 | Farina et al. |
| 5,089,064 A | 2/1992 | Reghi |
| 5,091,023 A | 2/1992 | Saeki et al. |
| 5,125,989 A | 6/1992 | Hallman |
| 5,141,575 A | 8/1992 | Yoshitake et al. |
| 5,143,562 A | 9/1992 | Boulos |
| 5,242,714 A | 9/1993 | Steele et al. |
| 5,261,973 A | 11/1993 | Sienkowski et al. |
| 5,268,042 A | 12/1993 | Carlson |
| 5,281,282 A | 1/1994 | Dolan et al. |
| 5,298,092 A | 3/1994 | Schriever |
| 5,304,257 A | 4/1994 | Pearlstein et al. |
| 5,308,709 A | 5/1994 | Ogino et al. |
| 5,318,640 A | 6/1994 | Ishii et al. |
| 5,321,061 A | 6/1994 | Anderson |
| 5,342,456 A | 8/1994 | Dolan |
| 5,342,556 A | 8/1994 | Traeubel et al. |
| 5,356,490 A | 10/1994 | Dolan et al. |
| 5,366,567 A | 11/1994 | Ogino et al. |
| 5,374,347 A | 12/1994 | Pearlstein et al. |
| 5,378,291 A | 1/1995 | Ara et al. |
| 5,378,292 A | 1/1995 | Miller et al. |
| 5,378,392 A | 1/1995 | Murashiro et al. |
| 5,391,239 A | 2/1995 | Boulos |
| 5,393,354 A | 2/1995 | Bishop |
| 5,395,655 A | 3/1995 | Oyama Kazuyuki et al. |
| 5,399,209 A | 3/1995 | Suda et al. |
| 5,407,749 A | 4/1995 | Bishop |
| 5,411,606 A | 5/1995 | Schriever |
| 5,415,687 A | 5/1995 | Schreiver |
| 5,415,702 A | 5/1995 | Bishop et al. |
| 5,427,623 A | 6/1995 | Schumann et al. |
| 5,427,632 A | 6/1995 | Dolan |
| 5,449,414 A | 9/1995 | Dolan |
| 5,449,415 A | 9/1995 | Dolan |
| 5,451,271 A | 9/1995 | Yoshida et al. |
| 5,452,884 A | 9/1995 | Gugsch et al. |
| 5,454,882 A | 10/1995 | Ashi et al. |
| 5,472,522 A | 12/1995 | Kawaguchi et al. |
| 5,472,524 A | 12/1995 | Schriever |
| 5,487,949 A | 1/1996 | Schriever |
| 5,498,300 A | 3/1996 | Aoki et al. |
| 5,498,759 A | 3/1996 | Nakada et al. |
| 5,507,084 A | 4/1996 | Richter |
| 5,507,884 A | 4/1996 | Ogino et al. |
| 5,534,082 A | 7/1996 | Dollman et al. |
| 5,551,994 A | 9/1996 | Schriever |

(Continued)

FOREIGN PATENT DOCUMENTS

| | | |
|---|---|---|
| EP | 1378585 A1 | 1/2004 |
| EP | 1447460 A1 | 8/2004 |

(Continued)

OTHER PUBLICATIONS

JP Notification of Reasons for Rejection dated Mar. 19, 2013, Application No. 2009-510172 (with English Translation and 2nd Office Action Comments), 10 Pages.

(Continued)

*Primary Examiner* — Humera N Sheikh
*Assistant Examiner* — Xiaobei Wang
(74) *Attorney, Agent, or Firm* — Mary K. Cameron

(57) ABSTRACT

A low sludge trivalent chromium based conversion coating bath is provided which forms corrosion resistant coatings on aluminum and aluminum alloys by contact with the bath, which is suitable for use as a rinseable or dry-in place conversion coating for metal, that comprises trivalent chromium cations, fluorometallate anions, guanidinium ions and at least one organic anti-corrosion additive, and other optional components, as well as methods of making and using same, and metals coated using the compositions, the coated aluminum serving as an effective base for paint primers.

21 Claims, No Drawings

(56) References Cited

U.S. PATENT DOCUMENTS

| | | | |
|---|---|---|---|
| 5,595,611 A | 1/1997 | Boulos et al. | |
| 5,645,650 A | 7/1997 | Ishizaki et al. | |
| 5,683,816 A | 11/1997 | Goodreau | |
| 5,700,334 A | 12/1997 | Ishii et al. | |
| 5,700,561 A | 12/1997 | Mano et al. | |
| 5,702,759 A | 12/1997 | White et al. | |
| 5,769,667 A | 6/1998 | Belopolsky | |
| 5,769,967 A | 6/1998 | Dolan | |
| 5,807,442 A | 9/1998 | Goodreau | |
| 5,851,371 A | 12/1998 | Steinbrecher et al. | |
| 5,859,095 A | 1/1999 | Moyle et al. | |
| 5,958,511 A | 9/1999 | Dolan | |
| 6,010,263 A | 1/2000 | White et al. | |
| 6,096,140 A | 8/2000 | Susa et al. | |
| 6,099,714 A | 8/2000 | Bibber | |
| 6,149,735 A | 11/2000 | Oue et al. | |
| 6,248,181 B1 | 6/2001 | Osako et al. | |
| 6,294,262 B1 | 9/2001 | Fukuoka | |
| 6,361,622 B1 | 3/2002 | McCormick et al. | |
| 6,375,726 B1 | 4/2002 | Matzdorf et al. | |
| 6,511,532 B2 | 1/2003 | Matzdorf et al. | |
| 6,521,029 B1 | 2/2003 | Matzdorf et al. | |
| 6,527,841 B2 | 3/2003 | Matzdorf et al. | |
| 6,596,062 B2 | 7/2003 | Chung et al. | |
| RE38,285 E | 10/2003 | Susa et al. | |
| 6,648,986 B1 | 11/2003 | Tang et al. | |
| 6,663,700 B1 | 12/2003 | Matzdorf et al. | |
| 6,669,764 B1 | 12/2003 | Matzdorf et al. | |
| 6,706,123 B2 | 3/2004 | Fristad et al. | |
| 6,723,178 B1 | 4/2004 | Bannai et al. | |
| 6,887,321 B2 | 5/2005 | Parkos, Jr. et al. | |
| 7,018,486 B2 | 3/2006 | Bhatia | |
| 7,328,873 B2 | 2/2008 | Suzuki et al. | |
| RE40,406 E | 7/2008 | McCormick et al. | |
| 8,092,617 B2 | 1/2012 | Kramer et al. | |
| 8,241,744 B2 | 8/2012 | Kikuchi et al. | |
| 2002/0053301 A1 | 5/2002 | Matzdrof et al. | |
| 2002/0117236 A1 | 8/2002 | Matzdorf et al. | |
| 2003/0027011 A1 | 2/2003 | Kotov et al. | |
| 2003/0145909 A1 | 8/2003 | Diaddario, Jr. et al. | |
| 2003/0217787 A1 | 11/2003 | Parkos, Jr. et al. | |
| 2003/0230215 A1 | 12/2003 | Matzdorf et al. | |
| 2004/0000358 A1 | 1/2004 | Bhatia | |
| 2004/0217328 A1* | 11/2004 | Matsui | C08L 79/00 252/388 |
| 2005/0109426 A1 | 5/2005 | Inoue et al. | |
| 2005/0178475 A9 | 8/2005 | Bhatia | |
| 2005/0194574 A1 | 9/2005 | Yamamuro et al. | |
| 2006/0116537 A1 | 6/2006 | Cuzzato | |
| 2006/0180247 A1 | 8/2006 | Matzdorf et al. | |
| 2006/0191599 A1 | 8/2006 | Matzdorf et al. | |
| 2006/0237098 A1 | 10/2006 | Matzdorf et al. | |
| 2006/0240191 A1 | 10/2006 | Matzdorf et al. | |
| 2007/0089808 A1 | 4/2007 | Hashimoto | |
| 2007/0187001 A1 | 8/2007 | Kramer et al. | |
| 2009/0045379 A1* | 2/2009 | Pellet et al. | 252/387 |
| 2010/0132843 A1* | 6/2010 | Kramer | 148/247 |
| 2010/0170594 A1* | 7/2010 | Inbe et al. | 148/241 |
| 2012/0177946 A1 | 7/2012 | Brouwer et al. | |
| 2014/0084221 A1* | 3/2014 | Matzdorf | C09D 5/084 252/512 |

FOREIGN PATENT DOCUMENTS

| | | |
|---|---|---|
| EP | 1992718 A1 | 11/2008 |
| JP | 61587 A | 1/1986 |
| JP | 7126859 A | 5/1995 |
| JP | 11335865 A | 12/1999 |
| JP | 11343450 A | 12/1999 |
| JP | 2001174192 A | 6/2001 |
| JP | 2002332575 A | 11/2002 |
| JP | 2004002950 A | 1/2004 |
| JP | 2004210873 A | 7/2004 |
| JP | 3784400 B1 | 6/2006 |
| JP | 2006328501 A | 12/2006 |
| SU | 1450400 A1 | 11/1990 |
| WO | 9908806 A1 | 2/1999 |
| WO | 02055758 A2 | 7/2002 |
| WO | 03040431 A2 | 5/2003 |
| WO | 03040437 A1 | 5/2003 |
| WO | 2004065642 A2 | 8/2004 |
| WO | 2005056876 A1 | 6/2005 |
| WO | 2006088519 A2 | 8/2006 |
| WO | 2006128154 A1 | 11/2006 |
| WO | 2007095517 A1 | 8/2007 |
| WO | 2007134152 A1 | 11/2007 |

OTHER PUBLICATIONS

Japanese Notice of Reasons for Rejection dated May 29, 2014, Application No. 2009-510172, 8 Pages.

Chinese Notification of the First Office Action dated Apr. 13, 2010, Applicant Henkel AG & Co. KGAA, 6 Pages.

Extended European Search Report dated Jul. 22, 2011, Applicant Henkel AG & Co, KGaA.

JP Notification of Reasons for Rejection, dated May 29, 2012, Application No. 2009-510172, 3 Pages.

PCT International Search Report dated Jul. 6, 2007, Application No. PCT/US2007/062026, Applicant Henkel Kommanditgesellschaft Auf Aktien, 4 Pages.

PCT Written Opinion of the International Searching Authority dated Jul. 6, 2007, Application No. PCT/US2007/062026, Applicant Henkel Kommanditgesellschaft Auf Aktien, 6 Pages.

PCT International Search Report dated Sep. 20, 2007, Application No. PCT/US2007/068640, Applicant Henkel Kommanditgesellschaft Auf Aktien, 3 Pages.

PCT Written Opinion of the International Searching Authority dated Sep. 20, 2007, Application No. PCT/US2007/068640, Applicant Henkel Kommanditgesellschaft Auf Aktien, 4 Pages.

Final Office Action dated Aug. 27, 2015, U.S. Appl. No. 11/746,802, 12 Pages.

International Search Report for PCT/IB2014/001018, dated Oct. 22, 2014, 3 pages.

Written Opinion for PCT/IB2014/001018, dated Oct. 22, 2014, 7 pages.

* cited by examiner

TRIVALENT CHROMIUM-CONTAINING COMPOSITION FOR ALUMINUM AND ALUMINUM ALLOYS

FIELD OF THE INVENTION

This invention relates to a method of treating metal surfaces to enhance corrosion resistance and paint bonding characteristics and relates to trivalent chromium-containing compositions for coating aluminum and aluminum alloys used in such processes. More particularly, this invention relates to an aqueous composition, suitable for use as a rinseable or dry-in place conversion coating for metal, that comprises trivalent chromium cations, fluorometallate anions, their corresponding counter-ions, and at least one organic anti-corrosion additive, and other optional components, and methods of making and using same, as well as metals coated using the compositions.

BACKGROUND OF THE INVENTION

It is generally known to treat the surfaces of metals, such as zinc, cadmium, or aluminum with aqueous solutions that include hexavalent chromium, which contain chemicals that dissolve the surface of the metal and form insoluble films known as "chromate conversion coatings." These hexavalent chromium-containing coatings are corrosion resistant and protect the metal from various elements which cause corrosion. In addition, it is known that chromate conversion coatings generally have good paint bonding characteristics and, therefore, provide an excellent base for paint or other finishes.

Although the aforementioned coatings enhance corrosion resistance and paint bonding properties, the coatings have a serious drawback, i.e., the hazardous nature of hexavalent chromium. This is a serious problem from two viewpoints, one being the handling of the solution by operators and the other, the disposal of the used solution. Therefore, it is highly desirable to have coating solutions and coatings that are substantially free of hexavalent chromium, but at the same time capable of imparting corrosion resistance and paint bonding properties which are comparable to those imparted by conventional hexavalent chromium-containing coatings.

Of particular interest is the use of chromate conversion coatings on aircraft aluminum alloys due to the need for excellent corrosion resistance and the ability to serve as an effective base for paint. Conventional baths used to develop these coatings contain hexavalent chromium, and residual chromates in the coating are largely responsible for the high degree of corrosion inhibition. However, these same chromates are hazardous and their presence in waste water effluents is severely restricted. It would therefore, be desirable to provide a coating for aluminum and its alloys, and for sealing of anodized aluminum, utilizing other chemicals as an alternative to the hexavalent chromate coatings.

Trivalent chromium has been used in conversion coatings in addition to and instead of hexavalent chromium in an attempt to produce replacements for hexavalent chromium-containing coatings, but to date, these attempts have been only somewhat successful. Particularly in the aerospace industry, there remains a need for improved performance in trivalent chromium containing coating compositions. When applied to thoroughly deoxidized aluminum alloys, in particular AA2024T3, trivalent chromium containing coating compositions result in coatings with reduced corrosion performance as compared to chromate coatings. Another drawback of current trivalent chromium containing coatings is that they are difficult to detect with the naked human eye. This presents problems in differentiating coated and uncoated substrates and in performing quality checks for coating coverage.

Another drawback of some trivalent chromium corrosion preventive compositions is that they are not storage stable in that, upon aging for about 1-2 weeks, a precipitate begins to form, even in unused compositions. In use, the working bath can generate a significant amount of sludge that must be removed, which can result in costly down-time for the processing line and disposal issues, or left undisturbed during processing to avoid powder residue on the coated substrate. The onset of precipitation in the bath also has a negative impact on the conversion coating formed. The conversion coatings from aged baths of the prior art have reduced corrosion resistance. Thus there is a need for an improved trivalent chromium corrosion preventive coating that overcomes these and other drawbacks of the prior art.

SUMMARY OF THE INVENTION

It is an aspect of the invention to provide compositions for treating a metal surface comprising a component of fluorometallate anions; a source of chromium(III) cations; a source of guanidinium cation; a source of nitrate; at least one organic anti-corrosion additive and, optionally, one or more of the following components: a component of free fluoride ions; a component of surfactant molecules; a pH adjusting component and a viscosity increasing component.

It is an further aspect of the invention to provide compositions for treating a metal surface comprising a source of anions at least one element "M" selected from the group consisting of titanium, zirconium, hafnium, silicon, aluminum, and boron; a source of chromium(III) cations; a source of guanidinium cation; a source of nitrate; a component of free fluoride ions; and, optionally, at least one organic anti-corrosion additive; one or more of the following components: a component of surfactant molecules; a pH adjusting component and a viscosity increasing component.

It is at least one aspect of this invention to provide a novel chromium-containing solution for treating aluminum, which contains no hexavalent chromium. It is another aspect of this invention to provide a composition for treating aluminum which essentially contains chromium only in its trivalent oxidation state.

It is still another aspect of this invention to provide a trivalent chromium-containing solution wherein said chromium has little or no tendency to precipitate from the solution upon storage at 60 degrees C. for at least, in increasing order of preference, 2 weeks, 4 weeks, 6 weeks, 8 weeks, 10 weeks or 12 weeks.

It is likewise an aspect of the invention to provide a coating, that is formed by contacting the metal surface with a composition of the invention and then rinsing or drying-in-place, which comprises chromium in substantially only trivalent form and which provides salt spray resistance of at least, with increasing preference, 96, 120, 144, 168, 192, 216, 240, 264, 288, 312, 336, 360, 408, 456, 480, 504 hours according to ASTM B-117 (03).

This invention is particularly useful for forming a adherent corrosion resistant conversion coating on metal surfaces consisting predominantly of steel, titanium and its alloys, aluminum and its alloys, magnesium and its alloys and/or zinc and its alloys; such substrates include aluminum/zinc alloy coated steel and iron/zinc alloy coated steel, e.g. Galvalume™ and Galvaneal™. One of skill in the art will understand "predominantly" as used herein to mean the predominant element is the one comprising the greatest amount by weight of the alloy. Other objects will be apparent to those skilled in the art from the description below.

Except in the stated aspects and the operating examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Numerical ranges provided throughout the description and claims are meant to include all subset ranges, that is, it is intended that the range comprises all sub ranges found within the stated range, for example $C_{1-10}$ also discloses $C_{2-10}$, $C_{1-9}$ and $C_{3-7}$, and an amount of 1-100 also discloses 1-99, 2-100, and 45-50. Also, throughout this description, unless expressly stated to the contrary: percent, "parts of", and ratio values are by weight; the term "fluorometallate anions" as used herein includes anions containing fluorine and at least one of a transition metal and a metalloid; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description or of generation in situ by chemical reactions specified in the description, and does not necessarily preclude other chemical interactions among the constituents of a mixture once mixed; specification of materials in ionic form additionally implies the presence of sufficient counter ions to produce electrical neutrality for the composition as a whole (any counter ions thus implicitly specified should preferably be selected from among other constituents explicitly specified in ionic form, to the extent possible; otherwise such counter ions may be freely selected, except for avoiding counter ions that act adversely to the objects of the invention); the term "paint" includes all like materials that may be designated by more specialized terms such as primer, lacquer, enamel, varnish, shellac, topcoat, and the like; and the term "mole" and its variations may be applied to elemental, ionic, and any other chemical species defined by number and type of atoms present, as well as to compounds with well defined molecules.

DETAILED DESCRIPTION OF A PREFERRED EMBODIMENT

This invention relates to an aqueous acidic composition, suitable for use as a rinseable or dry-in place conversion coating for metal, that comprises trivalent chromium cations, fluorometallate anions, their corresponding counterions, and at least one organic anti-corrosion additive, and other optional components, and methods of making and using same, as well as metals coated using the compositions. The invention also relates to an aqueous acidic composition, suitable for use as a rinseable or dry-in place conversion coating for metal, comprising a source of anions at least one element "M" selected from the group consisting of titanium, zirconium, hafnium, silicon, aluminum, and boron; a source of chromium(III) cations; a source of guanidinium cation; a source of nitrate; a component of free fluoride ions; and, optionally, at least one organic anti-corrosion additive; one or more of the following components: a component of surfactant molecules; a pH adjusting component and a viscosity increasing component.

One embodiment of the present invention provides a liquid conversion coating composition that comprises, preferably consists essentially of, or more preferably consists of, water and:
(A) a source of fluorometallate anions, each of said anions consisting of:
  (i) at least four fluorine atoms; and
  (ii) at least one atom of an element "M" selected from the group consisting of titanium, zirconium, hafnium, silicon, aluminum, and boron; and, optionally, one or both of
  (iii) at least one ionizable hydrogen atom; and
  (iv) at least one oxygen atom;
(B) a source of chromium(III) cations;
wherein the molar ratio of chromium(III) cations to component (A) ranges from 20:1 to 50:1.
(C) a source of guanidinium cation;
and, optionally, one or more of the following components:
(D) a source of nitrate anions;
(E) an organic corrosion inhibitor, preferably a triazole, for example a tolyltriazole that is not part of any of immediately previously recited components (A) through (D);
(F) a component of free fluoride ions that are not part of any of immediately previously recited components (A) through (E);
(G) a component of surfactant molecules that are not part of any of immediately previously recited components (A) through (F);
(H) a pH adjusting component that is not part of any of the immediately previously recited components (A) through (G); and
(I) a viscosity increasing component that is not part of any of the immediately previously recited components (A) through (H).

It should be understood that the components and sources listed need not necessarily all be provided by separate chemicals.

In another embodiment, the present invention provides a liquid conversion coating composition that comprises, preferably consists essentially of, or more preferably consists of, water and:
(A) a source of ions of at least one element "M" selected from the group consisting of titanium, zirconium, hafnium, silicon, aluminum, and boron;
(B) a source of chromium(III) cations;
wherein the molar ratio of chromium(III) cations to element "M" ranges from 20:1 to 50:1;
(C) a source of guanidinium cation;
and, optionally, one or more of the following components:
(D) a source of nitrate anions;
(E) an organic corrosion inhibitor, preferably a triazole, for example a tolyltriazole that is not part of any of immediately previously recited components (A) through (D);
(F) a component of free fluoride ions that are not part of any of immediately previously recited components (A) through (E);
(G) a component of surfactant molecules that are not part of any of immediately previously recited components (A) through (F);
(H) a pH adjusting component that is not part of any of the immediately previously recited components (A) through (G); and
(I) a viscosity increasing component that is not part of any of the immediately previously recited components (A) through (H).

It should be understood that the components listed need not necessarily all be provided by separate chemicals.

In one embodiment, the source of ions of at least one element "M" selected from the group consisting of titanium, zirconium, hafnium, silicon, aluminum, and boron is selected from fluorometallates, carbonates, basic carbonates, element "M" in the zero oxidation state, oxide, metal hydroxides and the like which are soluble in the composition and wherein the counter ions to the element "M" do not interfere with the objects of the invention.

In another embodiment, the present invention provides a method of coating metal substrates, in particular substrates having surfaces of aluminum and alloys of aluminum:
(I) contacting a metal substrate surface with the above described composition of the invention to form a wet coated metal substrate surface;
(II) optionally, rinsing the wet coated metal substrate surface; and
(III) drying the wet coated metal substrate surface, optionally with heating.

The compositions of the invention have been developed as hexavalent chromium-free. Although not preferred, formulations according to the invention can be made including hexavalent chromium, in which case these compositions having a non-zero amount of hexavalent chromium desirably contain less than 0.04, 0.02, 0.01, 0.001, 0.0001, 0.00001, or 0.000001 percent by weight of hexavalent chromium. The amount of hexavalent chromium present in the compositions of the invention is desirably minimized and preferably only trace amounts are present, most preferably no hexavalent chromium is present. In a preferred embodiment of the invention, the composition and the resulting coating are substantially free, desirably essentially free, of hexavalent chromium.

It is known in the prior art to oxidize some of the trivalent chromium in a coating to form hexavalent chromium, see U.S. Pat. No. 5,304,257. In the present invention, it is desirable that the coatings formed by compositions according to the invention contain little or no hexavalent chromium, though not preferred the compositions may contain hexavalent chromium in the amounts as recited in the immediately preceding paragraph. It will be understood by those of skill in the art that the invention includes coatings that contain no hexavalent chromium but which may, due to subsequent exposure to weathering or other treatments, contain hexavalent chromium resulting from oxidation of the trivalent chromium in the coating.

Various embodiments of the invention include processes for treating surfaces as described above, optionally in combination with other process steps, such as cleaning, deoxidizing, rinsing, and subsequent further protective coatings over those formed according to the invention; compositions useful for treating surfaces as described above; and articles of manufacture including surfaces treated according to a process of the invention.

Independently of the concentration of Component (A), the fluorometallate anions preferably are fluorosilicate (i.e., $SiF_6^{-2}$), fluorotitanate (i.e., $TiF_6^{-2}$) or fluorozirconate (i.e., $ZrF_6^{-2}$), more preferably fluorotitanate or fluorozirconate, most preferably fluorozirconate. A working composition for use in a process according to this invention preferably has a concentration of fluorometallate anions of at least, with increasing preference in the order given, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9 or 5.0 grams per liter of total working composition. The upper limit of fluorometallate anions is generally based upon solubility and/or the molar ratio of chromium(III) cations to component (A), and preferably is not more than with increasing preference 15, 14.5, 14, 13.5, 13, 12.5, 12, 11.5, 11, 10.5 or 10.0 grams per liter of total working composition. The cation for the fluorometallate anion may be selected from ions of Group IA elements, or ammonium ions. Preferably the cation is K or H, most preferably H.

Component (B) as defined above is to be understood as including one or more of the following sources of trivalent chromium cations: nitrates, sulfates, and fluorides of chromium(III). In a preferred embodiment, Component (B) comprises, preferably consists essentially of, most preferably consists of trivalent chromium fluoride. The total concentration of the trivalent chromium cation source in a working composition according to the invention is preferably at least, with increasing preference in the order given, 4, 5, 6, 7, 8, 9, 10, 11, 12, 13, 14, 15, 15.5, 16, 16.5, 17, 17.5, 18, 18.5, 19, 19.5, 20, 21, 22, 23, 24, 25, 26, 27, 28, 29, 30, 31, 32, 33, 34 or 35 g/l, and independently, primarily for reasons of economy and solubility, is preferably not more than, with increasing preference in the order given, 100, 90, 80, 70, 60, 55, 50, 45, 44, 43, 42, 41, 40, 39, 38, 37 or 36 g/l. The source of trivalent chromium is selected for solubility in the working bath, which is often a function of the nature and amounts of other components in the bath.

Independent of the amount of components (A) and (B) it is desirable that the molar ratio of trivalent chromium cations to the element "M", regardless of source, but also specifically including when the source of "M" is one of the fluorometallate anions, i.e. titanium, zirconium, hafnium, silicon, aluminum, and boron, is within the range of 1.27:1 to 68.4:1. Preferred ratios are at least, with increasing preference in the order given, 1.75:1, 3.5:1, 5.25:1, 7.0:1, 8.77:1, 10.5:1, 12.3:1, 14.0:1, 15.8:1, or 17.5:1 and preferably not more than, with increasing preference in the order given, 52.6:1, 50.9:1, 47.4:1, 43.8:1.

Where "M" is zirconium, and independent of the amount of components (A) and (B) it is desirable that the weight ratio of trivalent chromium cations to the element "M", is within the range of 0.725:1 to 39:1. Preferred ratios are at least, with increasing preference in the order given, 1:1, 2:1, 3:1, 4:1, 5:1, 6:1, 7:1, 8:1, 9:1 or 10:1 and preferably not more than, with increasing preference in the order given, 30:1, 29:1, 27:1 or 25:1.

Component (C), as defined above is to be understood as including one or more of the following sources of guanidinium cation: acetates, aminosulfonates, carbonates, nitrates, sulfates, sulfamates and thiocyanates. Component (C) is generally soluble in water and may be selected from any guanidine containing compound that provides guanidinium cation in solution and does not otherwise interfere with the corrosion resistance and adhesion of coatings according to the invention.

In a preferred embodiment, Component (C) comprises, preferably consists essentially of, most preferably consists of guanidine nitrate is the source of the guanidinium cation. Guanidine nitrate may be provided as a supplied material, or formed via a reaction of other materials, such as guanidine carbonate and nitric acid, and other components that can react to produce, or otherwise form, guanidine nitrate.

The amount of component (C), useful in compositions according to the invention is a quantity that provides an amount of guanidinium cation equal to guanidinium cation resulting from guanidine nitrate being present in a working composition at concentrations of at least, with increasing preference in the order given, 0.25, 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5 12, 12.5, 13, 13.5, 14, 14.5, or 15 g/l, and independently, primarily for reasons of economy and solubility, is preferably not more than, with increasing preference in the order given, 50, 45, 40, 35, 30, 28, 26, 24, 22, 20, 18 or 16 g/l.

Independent of the amount of components (A) and (C) it is desirable that the weight ratio of guanidinium cation to element "M" in the fluorometallate anions, i.e. titanium, zirconium, hafnium, silicon, aluminum, and boron, is within the range of 0.5:1 to 20:1. Preferred ratios are at least, with increasing preference in the order given, 0.6:1, 0.75:1, 1:1, 1.5:1, 2:1, 2.5:1, 3:1, 3.5:1, 4:1, 4, 5:1 or 5:1, and preferably not more than, with increasing preference in the order given, 20:1, 17.5:1, 15:1, 12.5:1, 10:1 or 7.5:1.

Component (D) the source of nitrate anions is generally soluble in water and may be selected from any nitrate source where the counter cation does not otherwise interfere with the corrosion resistance and adhesion of coatings according to the invention. Component (D) as defined above is to be understood as including one or more of the following water-soluble sources of nitrate anions: nitric acid, nitrate salts of alkali metals, alkaline earth metals, transition metals, lanthanide and actinide series elements, as well as guanidine nitrate. The nitrate anion may be present in a range of 0.25 g/l up to the solubility limit of the source of nitrate anion. Desirably, nitrate anion is present in a range of 0.5 to 25 g/l, preferably 1-10 g/l. In a preferred embodiment, Component (D) comprises, preferably consists essentially of, most preferably consists of guanidine nitrate. Preferred transition metal nitrate salts include those of Ti, Zr, Cr and Co.

Component (E) is a water-soluble or water-miscible organic corrosion inhibitor. Component (E) as defined above is to be understood be based upon one or more of the following: a thiazole compound, a triazole compound, a tetrazole compound and an imidazole compound. These compounds may be themselves soluble or miscible in water or the more soluble salts of said compounds may be used.

In a preferred embodiment, Component (E) comprises, preferably consists essentially of, most preferably consists of a triazole, and in at least one embodiment is tolyltriazole. Other triazoles include, but are not necessarily limited to, benzotriazole, carboxytriazole, sodium triazole, sodium tolyltriazole, potassium tolytrazole and mercaptobenzotriazole, to name a few. If present, component (E) is present in the working composition in at least, with increasing preference in the order given, 0.01, 0.025, 0.05, 0.075, 0.1, 0.25, 0.5, 0.75, 1.0, 1.25, 1.4, 1.5, 1.75, 2.0, 2.25, 2.5, 2.75 or 3.0 g/l, and independently, primarily for reasons of economy and solubility, is preferably not more than, with increasing preference in the order given, 10, 9, 8, 7, 6, 5.5, 5, 4.5, 4.25, 4.0, 3.8, 3.7 or 3.5 g/l.

Independent of the amount of components (A) and (E) it is desirable that the weight ratio of organic corrosion inhibitor to the element "M" in the fluorometallate anions, i.e. titanium, zirconium, hafnium, silicon, aluminum, and boron, is within the range of 0.03:1 to 6.0:1. Preferred ratios are at least, with increasing preference in the order given, 0.03:1, 0.075:1, 0.1:1, 0.2:1, 0.3:1, 0.4:1, 0.50:1, 0.075:1, 1:1, 1.25:1, 1.5:1, 1.75:1 or 2:1 and preferably not more than, with increasing preference in the order given 5.75:1, 5.5:1, 5:1, 4.5:1, 4:1, 3.5:1, 3:1 or 2.5:1.

A component of free fluoride ions (F) may optionally be provided, which may or may not be part of any of immediately previously recited components (A) through (E). This component may be supplied to the composition by hydrofluoric acid or any of its partially or completely neutralized salts that are sufficiently water soluble. At least for economy, component (F) is preferably supplied by aqueous hydrofluoric acid, and independently preferably is present in a concentration that is at least, with increasing preference in the order given, 0.10, 0.30, 0.50, 0.60, 0.70, 0.80, or 0.90 ppt of its stoichiometric equivalent as HF. Independently, in a working composition to be used in a process according to the invention, the concentration of component (F), measured as its stoichiometric equivalent as HF, preferably is not more than, with increasing preference in the order given, 10, 8.0, 6.0, 4.0, 3.0, 2.0, 1.5, 1.3, or 1.1 ppt. Suitable sources of free fluoride ions are known to those of skill in the art. Preferably, the source of (F) is HF.

Component (G), if used, is chosen from surfactants that are stable in the working bath pH and concentration of fluorine. Suitable surfactants can be anionic surfactants, such as salts of carboxylic acids, alkylsulphonates, alkyl-substituted phenylsulphonates; nonionic surfactants, such as alkyl-substituted diphenylacetylenic alcohols, fluorosurfactants and nonylphenol polyoxyethylenes; and cationic surfactants such as alkylammonium salts; all of these may and preferably do contain fluorine atoms bonded directly to carbon atoms in their molecules. Each molecule of a surfactant used preferably contains a hydrophobe portion that (i) is bonded by a continuous chain and/or ring of covalent bonds; (ii) contains a number of carbon atoms that is at least, with increasing preference in the order given, 10, 12, 14, or 16 and independently preferably is not more than, with increasing preference in the order given, 30, 26, 22, or 20; and (iii) contains no other atoms, in addition to carbon, except hydrogen, halogen, and ether-bonded oxygen atoms. Component (G) is most preferably a non-ionic fluorosurfactant, such materials are known in the art and commercially available under the Fluorad® trade name from 3M Company, under the Zonyl® trade name from E.I. du Pont de Nemours and Company, under the Masurf® trade name from Mason Chemical Co and under the APFS trade name from Advanced Polymer Inc.

A working composition according to the invention may contain, with increasing preference in the order given, at least 0.010, 0.030, 0.050, 0.070, 0.080, 0.090, or 0.100 ppt of component (G) and independently preferably, primarily for reasons of economy, contains not more than, with increasing preference in the order given, 5.0, 2.5, 1.30, 0.80, 0.60, 0.40, 0.30, 0.20, 0.18, 0.15, 0.13, or 0.11 ppt of component (G).

Compositions according to the invention are acidic. The pH preferably is at least, with increasing preference in the order given, 2.0, 2.10, 2.30, 2.50, 2.70, 2.90, 3.0, 3.10, 3.20, 3.30, 3.40, 3.50, 3.60, 3.70, 3.80, 3.90, or 4.0 and independently preferably is not more than, with increasing preference in the order given, 7.0, 6.50, 6.0, 5.50, 4.75, 4.50, 4.30 or 4.20. A pH adjusting component (H), which may or may not be part of any of the immediately previously recited components (A) through (G) can be added to the composition in an amount sufficient to produce a pH in the above-recited range, as necessary. A pH adjusting component may be any acid or a base, known in the art which does not interfere with the objects of the invention. In one embodiment, the pH adjuster is an acid, such as sulfuric acid, phosphoric acid, nitrous acid or nitric acid, preferably nitrous acid or nitric acid. In another embodiment, the pH adjusting component comprises a base such as ammonium hydroxide, KOH, or NaOH, and desirably is ammonium hydroxide.

Concentrates may be made, as single or multiple pack products, at 100 to 400% of the working bath concentrations, described herein, provided that the higher concentration does not result in instability, such as precipitation. Working baths can desirably be made by simple dilution with water, preferably deionized water. Generally, the ranges of amounts disclosed herein relate to working baths for dried-in-place applications. Where compositions of the invention are to be used in processes where the coated metal substrate is rinsed after removal from the conversion coating working bath of the invention, then, if desired, at least for economy, the amounts of the bath components may be reduced to 75% by weight of that used for dried-in-place applications.

Replenisher compositions useful for replenishing working baths according to the invention are provided herein. Replenisher compositions may comprise Components (A)-(D), as described above. (A) and (B) being present in an amount of about 100-200% of the concentrations disclosed for the working baths, and (D) and (E) being present in an amount of 200-300% of the concentrations disclosed for the working baths.

A working composition according to the invention may be applied to a metal workpiece, rinsed and dried thereon by any convenient method, several of which will be readily apparent to those skilled in the art. For example, coating the metal with a liquid film may be accomplished by immersing the surface in a container of the liquid composition, spraying the composition on the surface, coating the surface by passing it between upper and lower rollers with the lower roller immersed in a container of the liquid composition, contact with a brush or felt saturated with the liquid treatment composition, and the like, or by a mixture of methods. Excessive amounts of the liquid composition that might otherwise remain on the surface prior to drying may be removed before drying by any convenient method, such as rinsing, drainage under the influence of gravity, passing between rolls, and the like.

The temperature during application of the liquid composition may be any temperature within the liquid range of the composition, although for convenience and economy in application, normal room temperature, i.e., from 20-27° C., is usually preferred.

Application of compositions of the instant invention provide improved adhesive bonding to subsequently applied protective layers, such as paints, lacquers and other resin based coatings.

The total add-on mass (after drying) of the coating applied in a process according to the invention is at least, with increasing preference in the order given, 10, 12.5, 15, 17.5, 20, 22.5, 25, 27.5, 30, 32.5, 35, 37.5 or 40 milligrams per square foot of surface coated (hereinafter usually abbreviated as "mg/ft$^2$"). Independently, at least equal corrosion resistance ordinarily will be achieved even if the add-on mass is not, and therefore for reasons of economy the add-on mass preferably is not greater than, with increasing preference in the order given, 150, 130, 120, 110, 90, 75, 60, 50 or 45 mg/ft$^2$.

The add-on mass of the protective film formed by a process according to the invention may be conveniently monitored and controlled by measuring the add-on weight or mass of the metal atoms in the anions of component (A) as defined above, or of chromium, except in the unusual instances when the initial protective coating and/or the underlying metal substrate contains the same metal element(s). The amount of these metal atoms may be measured by any of several conventional analytical techniques known to those skilled in the art. The most reliable measurements generally involve dissolving the coating from a known area of coated substrate and determining the content of the metal of interest in the resulting solution. The total add-on mass can then be calculated from the known relationship between the amount of the metal in component (A) and the total mass of the part of the total composition that remains after drying. However, this method is often impractical for use with this invention, because the area touched up is not always precisely defined. A more practical alternative is generally provided by small area X-ray spectrographs that, after conventional calibration, directly measure the amount(s) per unit area of individual metallic element(s) present in a coating, free from almost all interferences except the same elements present in other coatings on, or in a thin layer near the surface of, the underlying metal surface itself.

The effectiveness of a treatment according to the invention appears to depend predominantly on the total amounts of the active ingredients that are present on each unit area of the treated surface, and on the nature of the active ingredients and their ratios to one another, rather than on the concentration of the acidic aqueous composition used, and the speed of drying has not been observed to have any technical effect on the invention, although it may well be important for economic reasons. If practical in view of the size of the object treated and the size of the areas of the object to be treated, drying may be speeded by placement of the surface to be treated, either before or after application to the surface of a liquid composition in a process according to the invention, in an oven, use of radiative or microwave heating, or the like. Heating the surface before treatment is preferred over heating after treatment when practical, and prewarming temperatures up to at least 65° C. may be satisfactorily used. If ample time is available at acceptable economic cost, a liquid film applied according to this invention often may simply be allowed to dry spontaneously in the ambient atmosphere with equally good results insofar as the protective quality of the coating is concerned. Suitable methods for each circumstance will be readily apparent to those skilled in the art.

Preferably, the surface to be treated according to the invention is first cleaned of any contaminants, particularly organic contaminants and metal fines and/or inclusions. Such cleaning may be accomplished by methods known to those skilled in the art and adapted to the particular type of substrate to be treated. For example, for galvanized steel surfaces, the substrate is most preferably cleaned with a conventional hot alkaline cleaner, then rinsed with hot water and dried. For aluminum, the surface to be treated most preferably is first contacted with a conventional water alkaline cleaner, then rinsed in warm water, then, optionally, contacted with a neutralizing acid rinse and/or deoxidized, before being contacted with an acid aqueous composition as described above. Deoxidizing may include mechanical or chemical removal of surface oxides from the metal surface to be coated. Desirably, at least 50%, 75% or 100% of the surface oxides are removed from the metal surface to be coated.

After the preparatory cleaning, the surface may be dried by absorption of the cleaning fluid, evaporation, or any suitable method known to those skilled in the art. Corrosion resistance is usually less than optimal when there is a delay between the preparatory cleaning, or cleaning and drying, and the coating of the surface. The time between cleaning, or cleaning and drying, and coating the surface should be no more than, in increasing order of preference, 48, 24, 12, 6.0, 5.0, 4.0, 3.0, 2.0, 1.0, 0.50, 0.25, or 0.1 hours.

The practice of this invention may be further appreciated by consideration of the following, non-limiting, working examples.

EXAMPLES

Example 1

Samples of trivalent chromium conversion coating compositions were made with various nitrate sources: guanidine nitrate, lanthanum nitrate, and manganese nitrate. Guanidine nitrate and lanthanum nitrate containing samples were tested at 0.5, 2, and 5 grams/liter in a base trivalent chromium conversion coating composition (base composition).

Sample preparation: One master batch of the base composition was made and split into separate samples, one sample having no nitrate was reserved as a control, and the other samples had different nitrate sources added to make the nitrate containing samples. Manganese nitrate was tested at 1, 4, and 10 g/L because that material was tested as a 50% liquid, where the others were tested as 100% active solids.

The base composition for all of the Examples unless stated otherwise comprised:

| Material | (%) |
|---|---|
| DI water | 97.2 |
| Chromium Floride | 2.3 |
| Fluorozirconic acid (45%) | 0.3 |
| Ammonium hydroxide | 0.2 |
| Total | 100% |

Two panels of aluminum alloy AA2024-T3 were processed for each of the baths in Table 1 were processed as follows: The panels were cleaned for 10 minutes in the aqueous alkaline degreaser Turco 6849 at 20% in tap water at a temperature of 57° C. The panels were rinsed in warm water (about 38° C.) overflowing tap water until the surface was water break free (about 3 minutes). Then the panels were deoxidized with Turco Deoxalume 2310 (made up at 15% Deoxalume 2310 with 25% nitric acid) and run for 5 minutes at room temperature (22° C.). Both Turco products are commercially available from Henkel Corporation. After the deoxidizing step, the panels were rinsed for 2 minutes in cool tap water (about 13° C.). From the rinse bath, the panels were immersed into one of the formulations in Table 1, and processed for 10 minutes. Lastly, the panels were rinsed in deionized water for 3 minutes and hung to air dry at room temperature. The panels were allowed to cure for 24 hours at room temperature, and then subjected to 336 hours ASTM B117 (03) salt fog corrosion testing. The results are shown below on Table 1.

TABLE 1

| | Number of Pits per 3 × 8 inch panel | | | | | | | |
|---|---|---|---|---|---|---|---|---|
| | Level of Nitrate in Grams/Liter | | | | | | | |
| | 0 | | 0.5 | | 2 | | 5 | |
| | Panel 1 | Panel 2 | Panel 1 | Panel 2 | Panel 1 | Panel 2 | Panel 1 | Panel 2 |
| base composition | 50 | 50 | | | | | | |
| base composition + guanidine nitrate | | | 4 | 2 | 10 | 6 | 0 | 1 |
| base composition + lanthanum nitrate | | | 5 | 40 | 25 | 25 | 7 | 20 |
| base composition + manganese nitrate | | | 40 | 25 | 40 | 40 | 25 | 6 |

The results show that all of the guanidine nitrate samples had particularly improved corrosion resistance and specifically at 5 g/L.

Example 2

These examples test the performance of the invention on two additional types of aluminum aerospace alloys (specifically AA6061-T6 and AA7075-T6). A new bath of the g/l guanidine nitrate in base composition bath was made up. This new bath was tested alongside a control base composition and an older, well used bath that contained 5 g/l guanidine nitrate in base composition.

Two panels each of aluminum alloy 2024-T3, AA6061-T6 and AA7075-T6 were processed and salt fog corrosion test according to the process used in Example 1. The result can be seen in Table 2 below.

TABLE 2

Number of Pits per 3 × 8 inch panel

| | Aluminum Alloy | | | | | |
|---|---|---|---|---|---|---|
| | AA2024-T3 | | AA6061-T6 | | AA7075-T6 | |
| | Panel 1 | Panel 2 | Panel 1 | Panel 2 | Panel 1 | Panel 2 |
| Base Composition Control | 25 | 25 | 5 | 3 | 0 | 5 |
| Base Composition + 5 g/L Guanidine nitrate - Old bath | 3 | 5 | 0 | 3 | 1 | 0 |
| Base Composition + 5 g/L Guanidine nitrate - New bath | 0 | 0 | 0 | 1 | 0 | 0 |

Example 3

In this example, the impact of different deoxidizers was studied. To do this, a ladder study of Deoxidizer HX-357 was run on the guanidine modified base composition bath and the base composition (unmodified). Deoxidizer HX-357 was studied at 0, 1, 2, 3, 4, & 5% concentrations in deionized water.

Two panels of aluminum alloy 2024-T3 were processed in each of the baths. The panels were cleaned for 10 minutes in Turco 6849 at 20% in tap water at a temperature of 57° C. The panels were rinsed in warm (about 38° C.) overflowing tap water until the surface was water break free (about 3 minutes). Then the panels were deoxidized with the deoxidizer from the Deoxidizer HX-357 ladder study, and run for 5 minutes at room temperature (about 22° C.). After deoxidizing, the panels were rinsed for 2 minutes in cool tap water (about 13° C.). All the panels were then desmutted using Turco Liquid Smut Go NC at 20% concentration for 2 minutes. After desmutting, the panels were rinsed for 2 minutes in cool tap water (about 13° C.). From the rinse bath, the panels were immersed into either base composition (unmodified) or the guanidine modified base composition, and processed for 10 minutes. Lastly, the panels were rinsed off in deionized water for 3 minutes and hung to air dry at room temperature. The panels were allowed to cure for 24 hours and subjected to 336 hours ASTM B117 salt fog corrosion testing. The results are shown in Table 3 below.

TABLE 3

Number of Pits per 3 × 8 inch panel

| | Base Composition (unmodified) | Base Composition + 5 g/L Guanidine nitrate |
|---|---|---|
| 0% Concentration of Deoxidizer HX-357 | 200 | 0 |
| 1% Concentration of Deoxidizer HX-357 | 0.5 | 0 |
| 2% Concentration of Deoxidizer HX-357 | 10 | 8 |
| 3% Concentration of Deoxidizer HX-357 | 15 | 10 |
| 4% Concentration of Deoxidizer HX-357 | 75 | 25 |
| 5% Concentration of Deoxidizer HX-357 | 100 | 40 |

The results show that the addition of guanidine nitrate again improves the corrosion resistance of the control coating. In this test, the no deoxidizer sample (0% Deoxidizer HX-357) and the 1% Deoxidizer HX-357 show no corrosion pits at all on the panels after 336 hours salt fog exposure.

Example 4

In this example, a design-of-experiment (DOE) was run to test the amount of guanidine nitrate, and to confirm the statistical significance of the invention. A mixture design was run to test the amount of guanidine nitrate and a second additive (manganese sulfate which proved unhelpful). A master batch of 20 g/L guanidine nitrate in the base composition was made, a master batch of 20 g/L manganese sulfate in the base composition was made, and a master batch of the base composition was made for use in the mixture design. Various levels of each of these three samples were blended into 2 liter samples. These mixtures translated into the guanidine nitrate concentration being varied between 0 g/L and 10 g/L (two times the previous tests).

Two panels of aluminum alloy 2024-T3 were processed in each of the baths according to the process and testing used in Example 1 for each one of the formulations shown in Table 4 below. After corrosion testing the panels were rated for the number of pits per panel, with the best case being 0. The two panels were rated, averaged and input into the Design Expert 7.1.1 DOE software. The results of the DOE analysis are shown in Table 4 below.

TABLE 4

| | Amount (in grams) of | | | Salt Spray | |
|---|---|---|---|---|---|
| | base composition | base composition w 20 g/L Guanidine Nitrate | base composition w 20 g/L Manganese Sulfate | Panel 1 | Panel 2 |
| Run #1 | 666.7 | 666.7 | 666.7 | 12 | 5 |
| Run #2 | 2000 | 0 | 0 | 3 | 10 |
| Run #3 | 0 | 2000 | 0 | 0 | 2 |
| Run #4 | 1000 | 1000 | 0 | 3 | 0 |
| Run #5 | 0 | 0 | 2000 | 3 | 10 |
| Run #6 | 333.3 | 1333.3 | 333.3 | 0 | 2 |
| Run #7 | 0 | 1000 | 1000 | 7 | 11 |
| Run #8 | 0 | 0 | 2000 | 13 | 10 |
| Run #9 | 333.3 | 333.3 | 1333.3 | 8 | 20 |
| Run #10 | 1000 | 1000 | 0 | 5 | 15 |
| Run #11 | 1000 | 0 | 1000 | 16 | 2 |
| Run #12 | 1333.3 | 333.3 | 333.3 | 6 | 7 |
| Run #13 | 0 | 2000 | 0 | 10 | 0 |
| Run #14 | 2000 | 0 | 0 | 27 | 5 |

This example again indicates that the addition of guanidine nitrate does indeed improve the corrosion resistance of the base composition. And in this example, a level of 10 g/L performed better than the original 5 g/L. The DOE predicted the ratings improved from 9.6 to 2 pits per panel with the guanidine compared to the control, where the actual observed values improve from 11.3 to 3—significant improvement in both cases.

Example 5

A master batch of the base composition was made and divided into four, 2-liter samples. The samples were modified as follows:

Sample A was used as a control, no additives were added.
Sample B was the master batch with 10 grams of guanidine nitrate added.
Sample C was the master batch with 0.2 grams of tolyltriazole added.
Sample D was the master batch with 10 grams of guanidine nitrate and 0.2 grams of tolyltriazole added.

To test the corrosion performance, the four samples were applied to several sets of AA2024-T3 bare aluminum panels. First, the panels were cleaned with Turco 6849, and then one set of panels was deoxidized in Deoxidizer 6/16 and another set was deoxidized in Deoxalume 2310, both products are commercially available from Henkel Corporation. Then, after the deoxidizing step, sets of panels were processed in conversion coating Samples A-D at room temperature (22° C.) for 10 minutes). The panels were allowed to air dry at room temperature for 72 hours and exposed to 336 hours ASTM B 117 salt spray testing. The results are shown in Table 5 below.

TABLE 5

| Panel ID | Deoxidizer | Conversion Coating | Salt Spray Result | | |
|---|---|---|---|---|---|
| | | | Panel 1 | Panel 2 | |
| 174A1 | 6/16 | Sample 1 | 150 Pits | 125 Pits | |
| 174A2 | 2310 | Sample 1 | 25 Pits | 15 Pits | |
| 174B1 | 6/16 | Sample 2 | 100 Pits | 75 Pits | |
| 174B2 | 2310 | Sample 2 | 0 Pits | 0 Pits | |
| 174C1 | 6/16 | Sample 3 | 100 Pits | 100 Pits | |
| 174C2 | 2310 | Sample 3 | 90% corrosion | 90% corrosion | 90% corrosion is equal to millions of pits |
| 174D1 | 6/16 | Sample 4 | 0 Pits | 0 Pits | |
| 174D2 | 2310 | Sample 4 | 0 Pits | 3 Pits | |

The results show (in the attached table) that Sample D, with both guanidine nitrate and tolyltriazole work better than the control or either of the additives used alone.

This invention provides a trivalent chromium-containing conversion coating composition that can be used in conversion coating a variety of metals including aluminum and aluminum alloy. It can be used in many variations of the processes that are employed in conversion coating of metal substrates. While the invention has been described in terms of specific embodiments thereof, it will be appreciated that other forms could readily be adapted by one skilled in the art. Accordingly, the scope of the invention is to be considered limited only by the following aspects.

What is claimed is:

1. A composition for coating a metal surface with a trivalent chromium based conversion coat, said composition comprising water and:
   (A) a source of fluorometallate anions, each of said anions consisting of:
      (i) at least four fluorine atoms; and
      (ii) at least one atom of an element "M" selected from the group consisting of titanium, zirconium, hafnium, silicon, aluminum, and boron; and, optionally, one or both of
      (iii) at least one ionizable hydrogen atom; and
      (iv) at least one oxygen atom;
   (B) a source of chromium(III) cations;
   wherein the molar ratio of chromium(III) cations to component (A) ranges from 20:1 to 50:1;
   (C) a source of guanidinium cation comprising a guanidine compound in a concentration of about 5 to 10 g/l;
   (E) an organic corrosion inhibitor in a weight ratio of the organic corrosion inhibitor to the element "M" in component (A) within a range of 0.01:1-6.0:1;
   and, optionally, one or more of the following components:
   (D) a source of nitrate anions;
   (F) a component of free fluoride ions that are not part of any of immediately previously recited components (A) through (E);
   (G) a component of surfactant molecules that are not part of any of immediately previously recited components (A) through (F);
   (H) a pH adjusting component that is not part of any of the immediately previously recited components (A) through (G); and
   (I) a viscosity increasing component that is not part of any of the immediately previously recited components (A) through (H);
   said composition being substantially free of hexavalent chromium, and wherein the organic corrosion inhibitor is not part of any of the previously recited components (A) through (D).

2. The composition according to claim 1, wherein the fluorometallate anions are selected from the group consisting of fluorosilicate, fluorotitanate, and fluorozirconate anions.

3. The composition according to claim 1, wherein component (C) comprises guanidinium nitrate.

4. The composition according to claim 1, wherein component (C) comprises one or more of acetates, aminosulfonates, carbonates, nitrates, sulfates, sulfamates and thiocyanates of guanidinium present in an amount sufficient to supply the guanidinium cation in an amount of 5 to 10 g/l.

5. The composition according to claim 3, wherein the fluorometallate anions include fluorozirconate anions in a concentration within a range from 0.4 to 15 g/l; wherein component (B) comprises water soluble chromium fluoride in a concentration within a range from 4 to 100 g/l; and the guanidine nitrate in a concentration of about 5 to 10 g/l.

6. The composition according to claim 1, wherein component (E) is present as a water-soluble or water-miscible organic corrosion inhibitor based upon one or more of: a thiazole compound, a triazole compound, a tetrazole compound and an imidazole compound.

7. The composition according to claim 6, wherein the triazole compound is a tolyltriazole.

8. The composition according to claim 1, wherein trivalent chromium and zirconium are present in a weight ratio of trivalent chromium to zirconium in a range of 40:1 to 50:1.

9. The composition according to claim 1, wherein:
the fluorometallate anions include fluorozirconate anions present in a concentration range from 0.4 to 1.5 g/l;
wherein component (B) comprises chromium fluoride present in a concentration range from 4 g/l to 100 g/l; and
the weight ratio of trivalent chromium to zirconium is in the range of 7:1 to 25:1.

10. The composition according to claim 1, wherein component (A) comprises fluorozirconate anions in an amount in said composition within a range from 1 to 8 g/l.

11. The composition according to claim 1, wherein component (B) is selected from the group consisting of nitrates, sulfates, and fluorides of chromium (III).

12. A composition for coating a metal surface with a trivalent chromium based conversion coat, said composition comprising water and:
(A) a source of ions of at least one element "M" selected from the group consisting of titanium, zirconium, hafnium, silicon, aluminum, and boron;
(B) a source of chromium(III) cations;
wherein the molar ratio of chromium(III) cations to element "M" ranges from 20:1 to 50:1;
(C) a source of guanidinium cation comprising a guanidine compound in a concentration of greater than 10 g/l to 50 g/l;
(E) an organic corrosion inhibitor;
and, optionally, one or more of the following components:
(D) a source of nitrate anions;
(F) a component of free fluoride ions that are not part of any of immediately previously recited components (A) through (E);
(G) a component of surfactant molecules that are not part of any of immediately previously recited components (A) through (F);
(H) a pH adjusting component that is not part of any of the immediately previously recited components (A) through (G); and
(I) a viscosity increasing component that is not part of any of the immediately previously recited components (A) through (H) and wherein the organic corrosion inhibitor is not part of any of the previously recited components (A) through (D).

13. The composition according to claim 12, wherein component (C) comprises one or more of acetates, aminosulfonates, carbonates, nitrates, sulfates, sulfamates and thiocyanates of guanidinium present in an amount sufficient to supply the guanidinium cation in an amount of 10 to 50 g/l.

14. The composition according to claim 12, wherein component (E) is present as a water-soluble or water-miscible organic corrosion inhibitor based upon one or more of: a thiazole compound, a triazole compound, a tetrazole compound and an imidazole compound.

15. The composition according to claim 12, wherein component (E) is a triazole compound present in an amount of 0.01 to 10 g/l.

16. A process for coating or touching up or both coating and touching up a surface with a trivalent chromium based conversion coat, said surface comprising at least one area of bare metal, optionally at least one area of coating over an underlying metal substrate, or both of at least one area of bare metal and at least one area of coating over an underlying metal substrate, said process comprising operations of:
(I) covering the surface to be coated, touched up, or both coated and touched up with a layer of a liquid composition of claim 1; and
(II) drying the liquid layer formed in operation (I) to form a trivalent chromium based conversion coated surface.

17. The process according to claim 16, wherein between operations (I) and (II), the surface is rinsed.

18. The process according to claim 16, wherein, in said liquid composition used in operation (I):
the fluorometallate anions include fluorozirconate anions present in a concentration range from greater than 10 to 15 g/l.

19. The process according to claim 16, wherein, in the liquid composition used in operation (I):
the fluorometallate anions include fluorozirconate anions present in a concentration range from 0.4 to 15 g/l; and wherein component (B) comprises chromium fluoride present in a concentration range from 4 g/l to 100 g/l.

20. An article of manufacture having at least one portion that comprises the coated surface of claim 16.

21. The article of manufacture of claim 20, said coated surface being essentially free of hexavalent chromium and having corrosion resistance properties characterized by less than 10 pits per 24 square inches when subjected to 5% neutral salt spray at 95° F. ASTMB-117 for at least 336 hours.

* * * * *

UNITED STATES PATENT AND TRADEMARK OFFICE
CERTIFICATE OF CORRECTION

PATENT NO.        : 10,156,016 B2
APPLICATION NO.   : 13/834047
DATED             : December 18, 2018
INVENTOR(S)       : Kirk Kramer and Lisa Salet Page 1 of 1

It is certified that error appears in the above-identified patent and that said Letters Patent is hereby corrected as shown below:

In the Specification

Column 7, Line 12, Change "4,5:1" to --4.5:1--.

Column 12, Line 56, Change "the g/l" to --the 5 g/l--.

Signed and Sealed this
First Day of October, 2019

Andrei Iancu
*Director of the United States Patent and Trademark Office*